US011704199B1

(12) United States Patent
Gernhardt et al.

(10) Patent No.: US 11,704,199 B1
(45) Date of Patent: Jul. 18, 2023

(54) DATA REPLICATION WITH CROSS REPLICATION GROUP REFERENCES

(71) Applicant: Snowflake Inc., Bozeman, MT (US)

(72) Inventors: Robert Bengt Benedikt Gernhardt, Seattle, WA (US); Nithin Mahesh, Kirkland, WA (US); Sahaj Saini, Seattle, WA (US); Matthew Uhlar, Seattle, WA (US)

(73) Assignee: Snowflake Inc., Bozeman, MT (US)

( * ) Notice: Subject to any disclaimer, the term of this patent is extended or adjusted under 35 U.S.C. 154(b) by 0 days.

(21) Appl. No.: 17/823,690

(22) Filed: Aug. 31, 2022

Related U.S. Application Data

(60) Provisional application No. 63/351,367, filed on Jun. 11, 2022.

(51) Int. Cl.
*G06F 16/25* (2019.01)
*G06F 16/27* (2019.01)
*G06F 11/14* (2006.01)

(52) U.S. Cl.
CPC ........ *G06F 11/1435* (2013.01); *G06F 16/256* (2019.01); *G06F 16/27* (2019.01); *G06F 2201/84* (2013.01)

(58) Field of Classification Search
CPC .... G06F 11/1435; G06F 16/27; G06F 16/256; G06F 2201/84
USPC ........................................................ 707/610
See application file for complete search history.

(56) References Cited

U.S. PATENT DOCUMENTS

| | | | |
|---|---|---|---|
| 2005/0044530 A1* | 2/2005 | Novik ................... | G06F 16/178 717/122 |
| 2005/0065978 A1* | 3/2005 | Zybura .................. | G06F 16/27 |
| 2005/0086384 A1* | 4/2005 | Ernst ...................... | G06F 16/27 709/248 |

* cited by examiner

*Primary Examiner* — Robert W Beausoliel, Jr.
*Assistant Examiner* — Arthur Ganger
(74) *Attorney, Agent, or Firm* — Womble Bond Dickinson (US) LLP

(57) ABSTRACT

This disclosure provides methods and techniques of data replication involving cross replication group (RG) references. The present disclosure avoids automatic replication failing when an entity in an RG refers to another entity external to the RG. The entity to be replicated within the RG is referred to as the "referring entity," and the entity as the dangling reference is referred to as the "referred entity." Although the referring and referred entities are not replicated together in a replication operation, the referred entity may have already been replicated to the target account in another replication operation on a different replication group. In such cases, the data replication procedure may, according to aspects of the present disclosure, check if the referred entity has already been replicated, and if so, proceed to replicate the referring entity without fail, and link the referring and referred entities to enable normal functioning of the referring entity.

30 Claims, 10 Drawing Sheets

DATA REPLICATION WITH CROSS REPLICATION GROUP REFERENCES

CROSS-REFERENCE TO RELATED APPLICATION

This application claims the benefit of U.S. Provisional Application Ser. No. 63/351,367, entitled "Data Replication with Cross Replication Group References," filed on Jun. 11, 2022, the disclosure of which are incorporated herein by reference in its entirety.

TECHNICAL FIELD

The present disclosure relates to databases and more particularly to data replication.

BACKGROUND

Databases are widely used for data storage and access in computing applications. One of the goals of database storage is to provide enormous sums of information in an organized manner so that the information can be easily accessed, managed, and updated. In a database, data may be organized into rows, columns, and tables. Different database storage systems may be used for storing different types of content, such as bibliographic, full text, numeric, and/or image content. Further, in computing, different database systems may be classified according to the organization approach of the database. There are many different types of databases, including relational databases, distributed databases, cloud databases, object-oriented and others.

Databases are used by various entities and companies for storing information that may need to be accessed or analyzed. In an example, a retail company may store a listing of all sales transactions in a database. The database may include information about when a transaction occurred, where it occurred, a total cost of the transaction, an identifier and/or description of all items that were purchased in the transaction, and so forth. The same retail company may also store, for example, employee information in that same database that might include employee names, employee contact information, employee work history, employee pay rate, and so forth. Depending on the needs of this retail company, the employee information and the transactional information may be stored in different tables of the same database. The retail company may have a need to "query" its database when it wants to learn information that is stored in the database. This retail company may want to find data about, for example, the names of all employees working at a certain store, all employees working on a certain date, all transactions for a certain product made during a certain time frame, and so forth.

When the retail store wants to query its database to extract certain organized information from the database, a query statement is executed against the database data. The query returns certain data according to one or more query predicates that indicate what information should be returned by the query. The query extracts specific data from the database and formats that data into a readable form. The query may be written in a language that is understood by the database, such as Structured Query Language ("SQL"), so the database systems can determine what data should be located and how it should be returned. The query may request any pertinent information that is stored within the database. If the appropriate data can be found to respond to the query, the database has the potential to reveal complex trends and activities. This power can only be harnessed through the use of a successfully executed query.

Traditional database management requires companies to provision infrastructure and resources to manage the database in a data center. Management of a traditional database can be very costly and requires oversight by multiple persons having a wide range of technical skill sets. Traditional relational database management systems (RDBMS) require extensive computing and storage resources and have limited scalability. Large sums of data may be stored across multiple computing devices. A server may manage the data such that it is accessible to customers with on-premises operations. For an entity that wishes to have an in-house database server, the entity must expend significant resources on a capital investment in hardware and infrastructure for the database, along with significant physical space for storing the database infrastructure. Further, the database may be highly susceptible to data loss during a power outage or other disaster situations. Such traditional database systems have significant drawbacks that may be alleviated by a cloud-based database system.

A cloud database system may be deployed and delivered through a cloud platform that allows organizations and end users to store, manage, and retrieve data from the cloud. Some cloud database systems include a traditional database architecture that is implemented through the installation of database software on top of a computing cloud. The database may be accessed through a Web browser or an application programming interface (API) for application and service integration. Some cloud database systems are operated by a vendor that directly manages backend processes of database installation, deployment, and resource assignment tasks on behalf of a client. The client may have multiple end users that access the database by way of a Web browser and/or API. Cloud databases may provide significant benefits to some clients by mitigating the risk of losing database data and allowing the data to be accessed by multiple users across multiple geographic regions.

Multiple architectures have been used in traditional database systems and cloud database systems. The database data are often replicated in either the traditional or cloud database systems in order to safeguard against system failures that may render data inaccessible, such as over a cloud network and/or may result in data to be lost or permanently unreadable/unretrievable if backup data have not been properly replicated. Often, only data cross-referenced within a common replication group are replicated to maintain the interconnection therein. However, data replication may, in some cases, involve entities that reference other entities outside of the current replication group (referred to as cross replication group references). The replication commands for such entities (that reference other external entities) have been programmed to be failed, such as by automatically aborting the replication on such entities.

In light of the foregoing, disclosed herein are systems, methods, and devices for database replication and enhancements thereof.

BRIEF DESCRIPTION OF THE DRAWINGS

Non-limiting and non-exhaustive implementations of the present disclosure are described with reference to the following figures, wherein like reference numerals refer to like or similar parts throughout the various views unless otherwise specified. Advantages of the present disclosure will become better understood with regard to the following description and accompanying drawings where.

DETAILED DESCRIPTION

Figure 1:
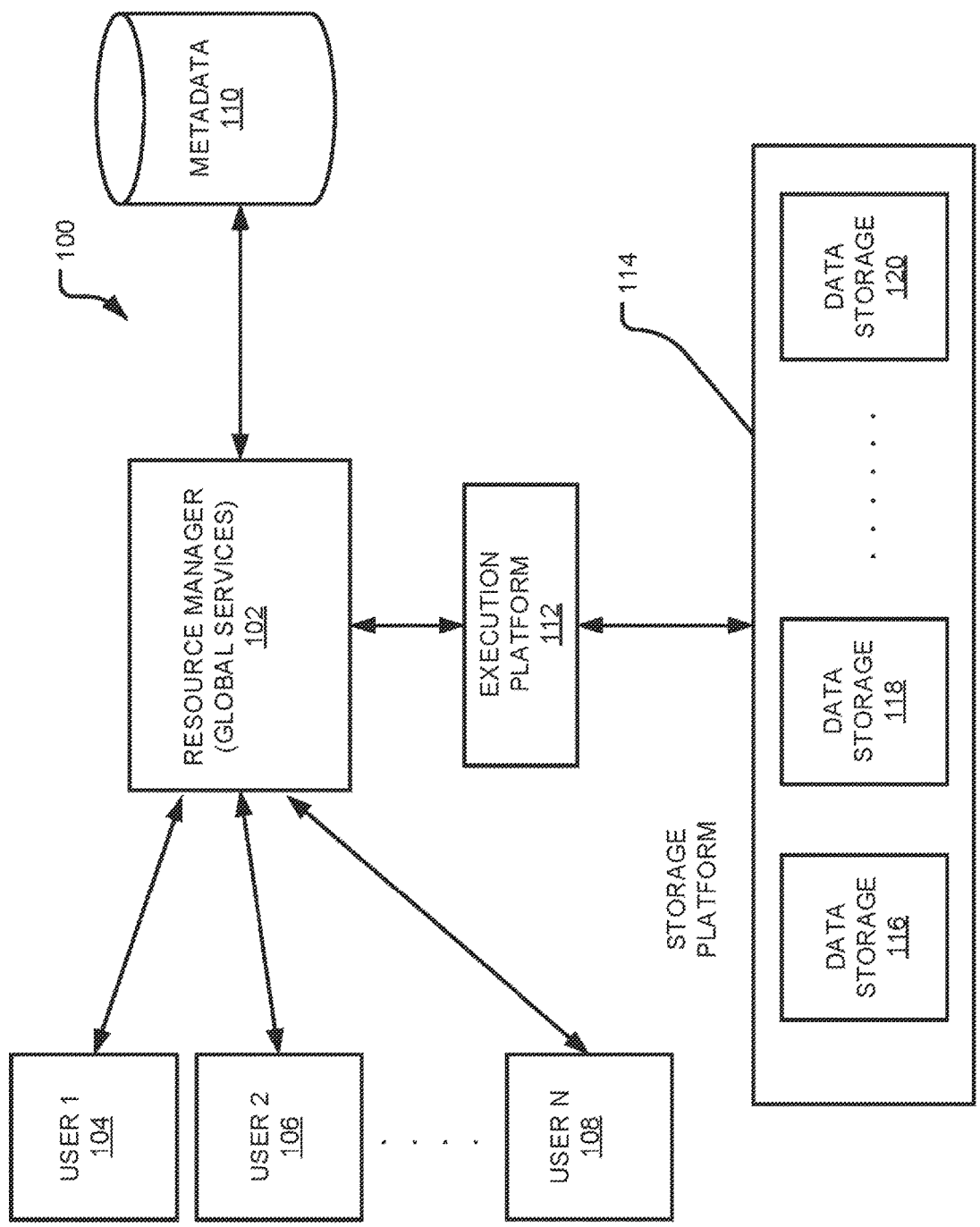
FIG. 1 illustrates a block diagram of components of a retrieval and data storage system in accordance with the teachings and principles of the disclosure.

The present disclosure provides systems, methods, and devices for batch database replication (e.g., backup) and failover (e.g., automatic transition to a backup) between multiple database deployments or database providers. For example, a system causes database data to be stored in a primary deployment and replicated in one or more secondary deployments. In the event that data in the primary deployment is unavailable, transactions may be executed on one or more of the secondary deployments. When the original primary deployment becomes available again, any transactions executed on secondary deployments may be propagated to the primary deployment. The system may be configured such that queries on the database data are executed on the primary deployment at any time when the primary deployment is available.

One general aspect of the present disclosure provides methods and techniques of data replication involving cross replication group (RG) references. Cross RG references may also be known as dangling references, which are entities outside of a replication group while being referred to by members in the replication group. When the cross RG references are referred to by a command of replication, conventional replication would fail (e.g., not execute) the command of replication. That is, data replication of an entity in an RG referring to another entity external to the RG is not allowed. The present disclosure avoids such automatic replication termination under certain conditions (e.g., without security breach). As such, commands of replication involving cross RG references may proceed with success.

In this disclosure, the entity to be replicated within the RG is referred to as the "referring entity," and the entity as the cross RG (or dangling) reference is referred to as the "referred entity." As described below, although the referring and referred entities are not replicated together in a replication operation, the referred entity may be or have already been replicated to a target account (e.g., the account to which the referring entity will be replicated) in another replication operation on a different replication group. In such cases, the data replication procedure may, according to aspects of the present disclosure, check if the referred entity has already been replicated, and if so, proceed to replicate the referring entity without fail, and link the referring and referred entities to enable normal functioning of the referring entity (and, after replication, the corresponding replicas).

In some cases, if the referred entity cannot be found (as being outside of RG) and the relationship is not security related (for example missing source tables for materialized views (MV) or streams), the replication task will proceed and succeed without the referred entity. A user will need to re-replicate the missing referred entity (once found) at a later time. Until then, the referring entity might not be in a usable state because of the absence of the referred entity. On the other hand, the replication referring entity to the secondary database will fail if the missing referred entity is security related, such as involving masking or row access policies, the data replication operation is automatically failed to avoid exposing sensitive data (e.g., data that may cause security breach). That is, the referring entity will not be replicated when the referred entity cannot be found and the relationship is security related.

The disclosed data replication techniques involving cross RG references provide various advantages. For example, data replication may avoid conventional disruption even if the data involve cross RG references, serving customers who may want to replicate different databases on different schedules. Such customers may place the databases in different replication groups, in which cross RG references may be present. For example, the customers may want to have references between entities in the databases not within the same RG, such as in cases where a materialized view in one database might reference a table in another database. Therefore, by enabling data replication with cross RG references, the customers are given the flexibility to run replication on separate schedules and may perform data replication of valid primary states. The cross RG references can thus be a valid state on the primary database for replication operations (instead of triggering an abort response automatically).

In an example, a customer may create a table with a column that refers to an auto-increment sequence. The customer may later drop the sequence (an allowed operation). But as a consequence of the sequence drop, later insertion operations may fail until the column is updated with a reference to a different sequence. According to aspects of the present disclosure, since the behavior of data replication is determined based on the type of the relationship among entities (e.g., when the relationship does not impact security), the replication operation may proceed without fail (unlike existing practices where the replication operation is failed or terminated).

Conventionally, data replication requires that the references are resolved within the same replication group (and/or within the same database to be replicated). In other words, when the data replication operation is performed, cross RG references are checked when a snapshot of the primary database is created. When a referring entity in a snapshot refers to a reference entity outside of the snapshot (and the replication group or database), the replication operation on the primary database is aborted or failed. Such status quo is not desirable when the cross RG references are not security related. Therefore, the present disclosure solves the cross RG referencing problems by allowing the data replication to continue when security conditions are satisfied.

For example, during a replication operation, a snapshot of the replication group on the primary database is created and analyzed. Because the snapshot contains metadata and data information for the secondary database to synchronize, the states of the entities to be replicated can be evaluated (to match the primary state). The states of the entities and relationship to cross RG references in the metadata (e.g., identified by global entity references) may be used to complete the replication operation, when conditions related to security concerns are satisfied.

To create a snapshot of the primary metadata, each entity on the primary database is visited. The information needed to replicate that entity is captured, such as by a snapshot of the primary entity metadata and additional metadata such as grants on the entity. If the entity refers to another entity, the relationship is stored in memory. For example, in the metadata for a column, the identifier (ID) of the auto increment sequence the column refers to is stored. For this relationship, the memory may save (COLUMN_TO_AUTO_INCREMENT_SEQUENCE, <sequence_id>). The ID of each entity visited and captured is also saved.

After the entities to be replicated have been visited in the snapshot operation, the relationships identified are examined or analyzed. For each relationship, the referenced entity involved is checked. If a referenced entity is already in the snapshot, then the relationship will be preserved during replication and no further action may be needed. That means the relationship is between two entities in the same RG, so the replicated entity in the secondary database may operate as intended.

On the other hand, if a referenced entity is not in the snapshot, the relationship is between two entities in different RGs (e.g., cross RG references). In this case, the referenced entity is retrieved, and the global entity reference of the referenced entity is added to a separate (e.g., new) section in the snapshot. The global entity reference is an identifier that ties (or allows for tying) together entities that are replicas of one another.

In general, when a replica of an original entity is created, the ID of the replica is not the same as the ID of the original entity. This applies to both the referring entity and the referred entity during replications: new IDs are generated for the respective replicas. To replicate the relationship between a referred entity (which may be a replicated referred entity) back to the referring entity (e.g., the replicated referring entity), a tuple (e.g., source_deployment_id, source_account_id, source_entity_id) is stored in the metadata of the replicated entity. A lookup mechanism may also be available for finding or locating a replicated entity (referring or referred), given the tuple (source_deployment_id, source_account_id, source_entity_id) of the primary entity.

The present disclosure enables data replication involving cross RG references, based on the global ID or global entity reference of the referred entity in the snapshot. The referencing or replication operations according to the present disclosure thus differ from conventional replications in that the cross RG references do not automatically terminate the replication operations. For example, on the secondary database, the snapshot of the primary database is used to update the metadata on the secondary database. When an entity on the secondary database is created or synchronized based on a source entity in the primary database, the information about the entity is captured in the snapshot on the primary database. The captured information is used to update the metadata of the entity on the secondary database. If the entity has a reference to another entity, such as a column that refers to auto increment sequence, the field for this relationship to the ID of the replica of the referred entity may then be updated as the sequence id on primary and secondary are different.

To update that reference, the primary entity in the snapshot is inspected. In some cases, the referenced entity may be removed. The referenced entity may use an ID from the primary database that requires remapping. Using the primary ID, the entity may be checked as part of the replication operation. For example, for each entity to be replicated or synchronized, a mapping between the respective primary ID and the ID on the secondary database will be recorded for the duration of the replication operation. When the mapping information is available, the corresponding field may be updated with the secondary ID. Otherwise, the dangling reference section of the snapshot may be used for identifying a global ID. With the global ID, the global entity reference of the referred entity on the primary database may be retrieved.

Using that global entity reference, the corresponding replica of the referred entity on the secondary database may be identified. Once found, the ID of the dangling reference may be updated in the entity being synchronized, thus re-establishing the association. Otherwise, the data replication may depend on the type of relationship between the referring and referred entities. If such a relationship is not security critical, the reference on the secondary database may be invalidated and data replication continues. If the relationship is security critical, the replication operation may then be terminated or aborted.

In the following description of the disclosure, reference is made to the accompanying drawings, which form a part hereof, and in which is shown by way of illustration specific implementations in which the disclosure may be practiced. It is understood that other implementations may be utilized, and structural changes may be made without departing from the scope of the disclosure.

In describing and claiming the disclosure, the following terminology will be used in accordance with the definitions set out below.

It must be noted that, as used in this specification and the appended claims, the singular forms "a," "an," and "the" include plural referents unless the context clearly dictates otherwise.

Reference throughout this specification to "one embodiment," "an embodiment," "one implementation," "an implementation," "one example," or "an example" means that a particular feature, structure, or characteristic described in connection with the embodiment, implementation, or example is included in at least one embodiment of the present disclosure. Thus, appearances of the above-identified phrases in various places throughout this specification are not necessarily all referring to the same embodiment, implementation, or example. In addition, it should be appreciated that the figures provided herewith are for explanation purposes to persons ordinarily skilled in the art.

As used herein, the terms "comprising," "including," "containing," and grammatical equivalents thereof are inclusive or open-ended terms that do not exclude additional, unrecited elements or method steps.

As used herein, "table" is defined as a collection of records (rows). Each record contains a collection of values of table attributes (columns). Tables are typically physically stored in multiple smaller (varying size or fixed size) storage units, e.g., files or blocks.

As used herein, "partitioning" is defined as physically separating records with different data to separate data partitions. For example, a table can partition data based on the country attribute, resulting in a per-country partition.

Embodiments in accordance with the present disclosure may be embodied as an apparatus, method or computer program product. Accordingly, the present disclosure may take the form of an entirely hardware-comprised embodiment, an entirely software-comprised embodiment (including firmware, resident software, micro-code, etc.) or an embodiment combining software and hardware aspects that may all generally be referred to herein as a "circuit," "module" or "system." Furthermore, embodiments of the present disclosure may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random-access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages. Such code may be compiled from source code to computer-readable assembly language or machine code suitable for the device or computer on which the code will be executed.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud).

The flow diagrams and block diagrams in the attached figures illustrate the architecture, functionality, and operation of possible implementations of systems, methods, and computer program products according to various embodiments of the present disclosure. In this regard, each block in the flow diagrams or block diagrams may represent a module, segment, or portion of code, which comprises one or more executable instructions for implementing the specified logical function(s). It will also be noted that each block of the block diagrams and/or flow diagrams, and combinations of blocks in the block diagrams and/or flow diagrams, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow diagram and/or block diagram block or blocks.

The systems and methods described herein may operate on a flexible and scalable data warehouse using a new data processing platform. In some embodiments, the described systems and methods leverage a cloud infrastructure that supports cloud-based storage resources, computing resources, and the like. Example cloud-based storage resources offer significant storage capacity available on-demand at a low cost. Further, these cloud-based storage resources may be fault-tolerant and highly scalable, which can be costly to achieve in private data storage systems. Example cloud-based computing resources are available on-demand and may be priced based on actual usage levels of the resources. Typically, the cloud infrastructure is dynamically deployed, reconfigured, and decommissioned in a rapid manner.

In the described systems and methods, a data storage system utilizes an SQL (Structured Query Language)-based relational database. However, these systems and methods are applicable to any type of database, and any type of data storage and retrieval platform, using any data storage architecture and using any language to store and retrieve data within the data storage and retrieval platform. The systems and methods described herein further provide a multi-tenant system that supports isolation of computing resources and data between different customers/clients and between different users within the same customer/client.

Referring now to FIG. 1, a computer system is illustrated for running the methods disclosed herein. As shown in FIG. 1, resource manager 102 may be coupled to multiple users 104, 106, and 108. In particular implementations, resource manager 102 can support any number of users desiring access to data processing platform 100. Users 104, 106, 108 may include, for example, end users providing data storage and retrieval requests, system administrators managing the systems and methods described herein, and other components/devices that interact with resource manager 102.

Resource manager 102 provides various services and functions that support the operation of all systems and components within data processing platform 100. Resource manager 102 may be coupled to metadata 110, which is associated with the entirety of data stored throughout data processing platform 100. In some embodiments, metadata 110 may include a summary of data stored in remote data storage systems as well as data available from a local cache. Additionally, metadata 110 may include information regarding how data is organized in the remote data storage systems and the local caches. Metadata 110 may allow systems and services to determine whether a piece of data needs to be processed without loading or accessing the actual data from a storage device.

Resource manager 102 may be further coupled to the execution platform 112, which provides multiple computing resources that execute various data storage and data retrieval tasks, as discussed in greater detail below. Execution platform 112 may be coupled to multiple data storage devices 116, 118, and 120 that are part of a storage platform 114. Although three data storage devices 116, 118, and 120 are shown in FIG. 1, execution platform 112 is capable of communicating with any number of data storage devices. In some embodiments, data storage devices 116, 118, and 120 are cloud-based storage devices located in one or more geographic locations. For example, data storage devices 116, 118, and 120 may be part of a public cloud infrastructure or a private cloud infrastructure. Data storage devices 116, 118, and 120 may be hard disk drives (HDDs), solid state drives (SSDs), storage clusters or any other data storage technology. Additionally, storage platform 114 may include distributed file systems (such as Hadoop Distributed File Systems (HDFS)), object storage systems, and the like.

In particular embodiments, the communication links between resource manager 102 and users 104, 106, 108, metadata 110, and execution platform 112 are implemented via one or more data communication networks. Similarly, the communication links between execution platform 112 and data storage devices 116, 118, 120 in storage platform 114 are implemented via one or more data communication networks. These data communication networks may utilize any communication protocol and any type of communication medium. In some embodiments, the data communication networks are a combination of two or more data communication networks (or sub-networks) coupled to one another. In alternative embodiments, these communication links are implemented using any type of communication medium and any communication protocol.

As shown in FIG. 1, data storage devices 116, 118, and 120 are decoupled from the computing resources associated with execution platform 112. This architecture supports dynamic changes to data processing platform 100 based on the changing data storage/retrieval needs as well as the changing needs of the users and systems accessing data processing platform 100. The support of dynamic changes allows data processing platform 100 to scale quickly in response to changing demands on the systems and components within data processing platform 100. The decoupling of the computing resources from the data storage devices supports the storage of large amounts of data without requiring a corresponding large amount of computing resources. Similarly, this decoupling of resources supports a significant increase in the computing resources utilized at a particular time without requiring a corresponding increase in the available data storage resources.

Resource manager 102, metadata 110, execution platform 112, and storage platform 114 are shown in FIG. 1 as individual components. However, each of resource manager 102, metadata 110, execution platform 112, and storage platform 114 may be implemented as a distributed system (e.g., distributed across multiple systems/platforms at multiple geographic locations). Additionally, each of resource manager 102, metadata 110, execution platform 112, and storage platform 114 can be scaled up or down (independently of one another) depending on changes to the requests received from users 104, 106, 108 and the changing needs of data processing platform 100. Thus, data processing platform 100 is dynamic and supports regular changes to meet the current data processing needs.

Figure 2:
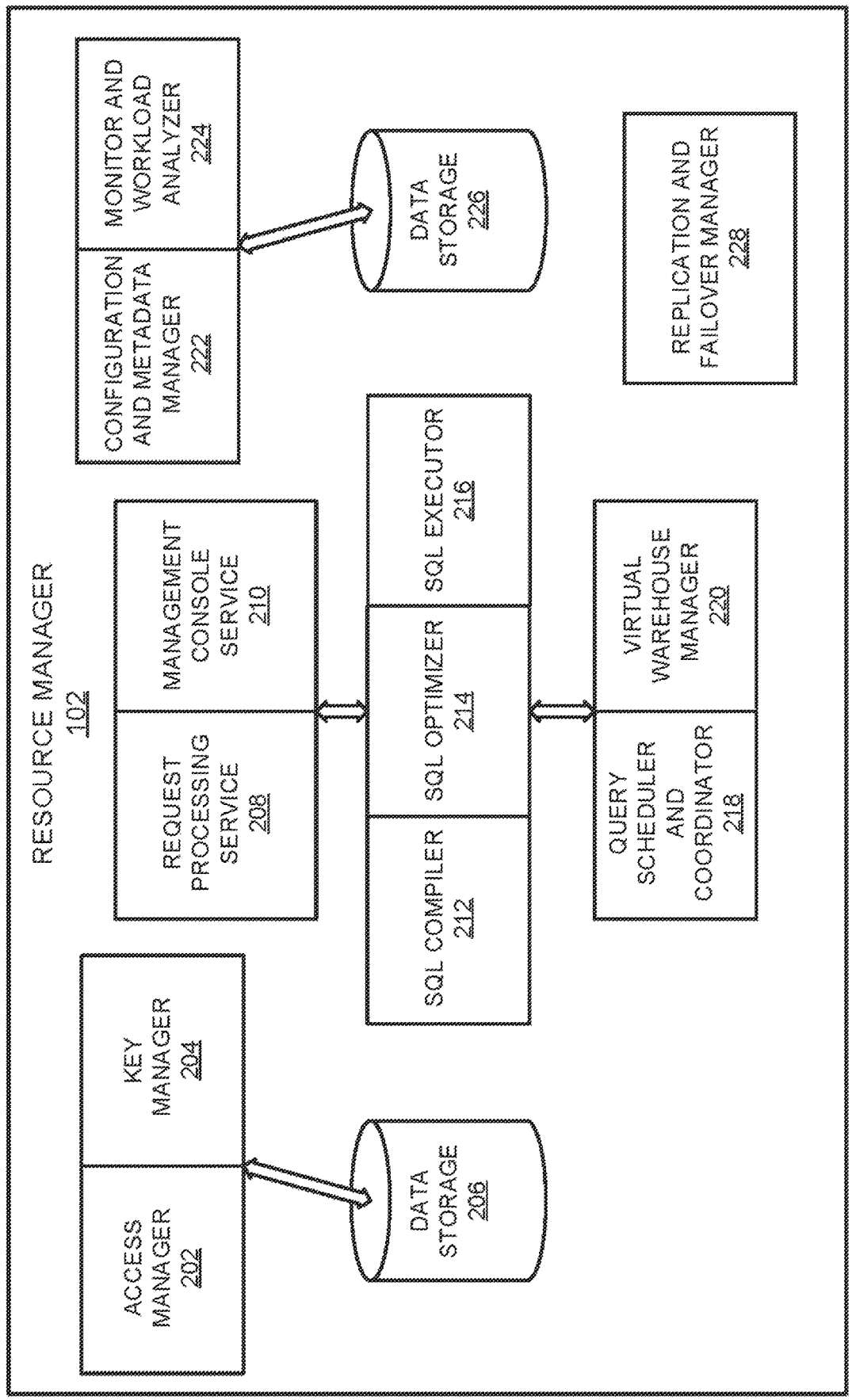
FIG. 2 illustrates a block diagram depicting an embodiment of a resource manager in accordance with the teachings and principles of the disclosure.

FIG. 2 is a block diagram depicting an embodiment of resource manager 102. As shown in FIG. 1, resource manager 102 includes an access manager 202 and a key manager 204 coupled to a data storage device 206. Access manager 202 may handle authentication and authorization tasks for the systems described herein. Key manager 204 may manage storage and authentication of keys used during authentication and authorization tasks. A request processing service 208 manages received data storage requests and data retrieval requests. A management console service 210 supports access to various systems and processes by administrators and other system managers.

Resource manager 102 may also include an SQL compiler 212, an SQL optimizer 214 and an SQL executor 216. SQL compiler 212 parses SQL queries and generates the execution code for the queries. SQL optimizer 214 determines the best method to execute queries based on the data that needs to be processed. SQL executor 216 executes the query code for queries received by resource manager 102. A query scheduler and coordinator 218 may send received queries to the appropriate services or systems for compilation, optimization, and dispatch to the execution platform 112. A virtual warehouse manager 220 manages the operation of multiple virtual warehouses implemented in an execution platform.

In some cases, the resource manager 102 may use a job compiler, a job optimizer, and/or a job executor in the place of the SQL compiler 212, the SQL optimizer 214, and the SQL executor 216. For example, the job compiler may parse a job into multiple discrete tasks and generates the execution code for each of the multiple discrete tasks. The job optimizer may determine the best method to execute the multiple discrete tasks based on the data that needs to be processed. The job optimizer also handles various data pruning operations and other data optimization techniques to improve the speed and efficiency of executing the job. The job executor executes the execution code for jobs determined by the resource manager 102.

Additionally, resource manager 102 includes a configuration and metadata manager 222, which manages the information related to the data stored in the remote data storage devices and in the local caches. A monitor and workload analyzer 224 oversees the processes performed by resource manager 102 and manages the distribution of tasks (e.g., workload) across the virtual warehouses and execution nodes in the execution platform. Configuration and metadata manager 222 and monitor and workload analyzer 224 are coupled to a data storage device 226.

Resource manager 102 also includes a replication and failover manager 228, which manages data replication requests, database failover, and database fail back. For example, replication and failover manager 228 manages and schedules batch data replication between multiple database storage resources and database deployments. In an embodiment, the replication and failover manager 228 may manage the replication of data stored within a primary deployment to be replicated within one or more secondary or backup deployments. Further, the replication and failover manager 228 may manage the shifting of database operations from a primary deployment to a secondary deployment when the primary deployment fails and/or may manage the shifting of database operations from the secondary deployment back to the primary deployment when the primary deployment becomes available again. The replication and failover manager 228 may ensure consistent data replication between the multiple deployments and may further ensure that any updates made to a first deployment while a second deployment is unavailable are propagated to the second deployment when the second deployment becomes available again.

Figure 3:
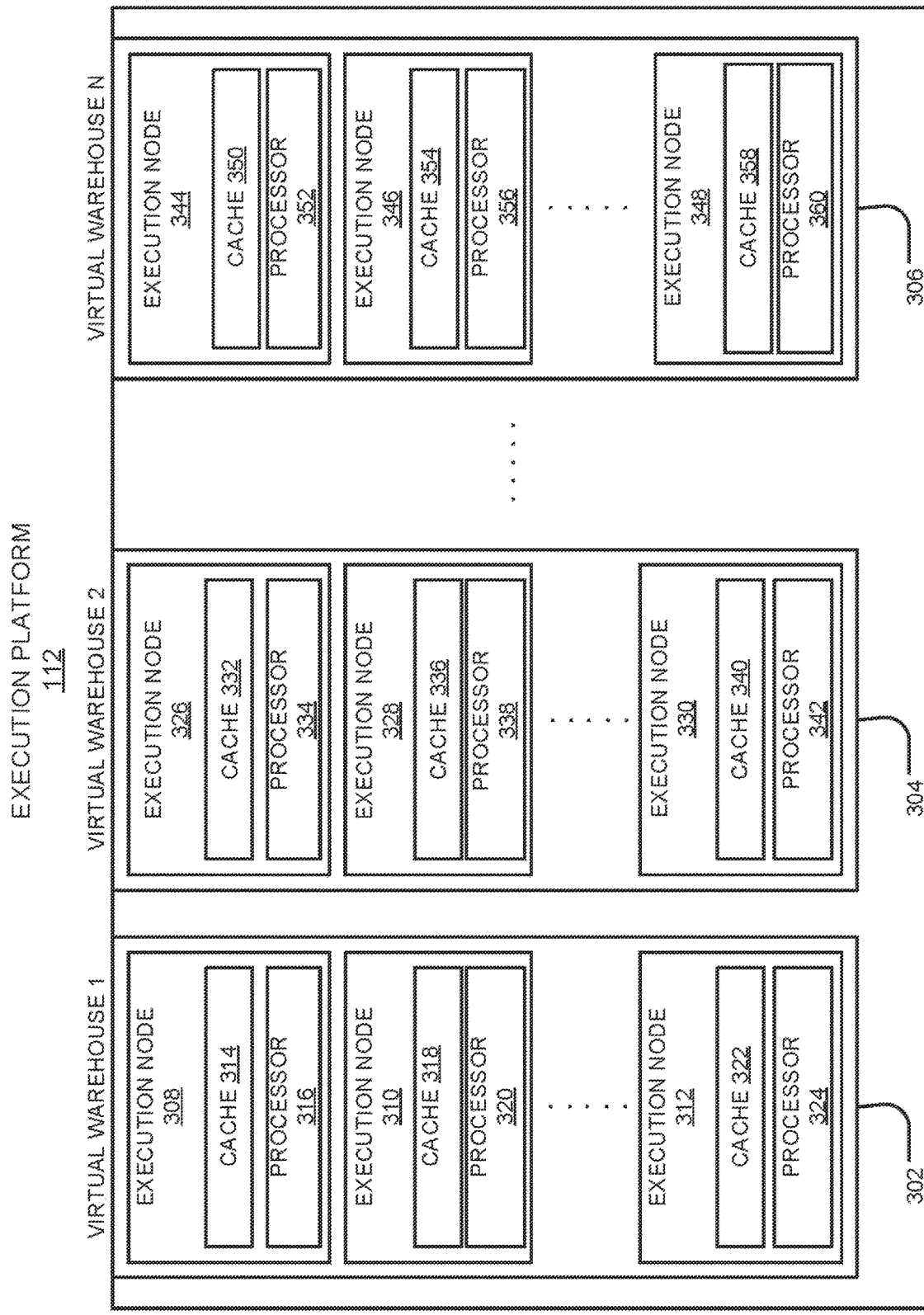
FIG. 3 illustrates a block diagram depicting an embodiment of an execution platform in accordance with the teachings and principles of the disclosure.

FIG. 3 is a block diagram depicting an embodiment of an execution platform. As shown in FIG. 3, execution platform 112 includes multiple virtual warehouses 302, 304, and 306. Each virtual warehouse includes multiple execution nodes that each includes a cache and a processor. Although each virtual warehouse 302, 304, 306 shown in FIG. 3 includes three execution nodes, a particular virtual warehouse may include any number of execution nodes without departing from the scope of the disclosure. Further, the number of execution nodes in a virtual warehouse is dynamic, such that new execution nodes are created when additional demand is present, and existing execution nodes are deleted when they are no longer necessary.

Each virtual warehouse 302, 304, 306 is capable of accessing any of the data storage devices 116, 118, 120 shown in FIG. 1. Thus, virtual warehouses 302, 304, 306 are not necessarily assigned to a specific data storage device 116, 118, 120 and, instead, can access data from any of the data storage devices 116, 118, 120. Similarly, each of the execution nodes shown in FIG. 3 can access data from any of the data storage devices 116, 118, 120. In some embodiments, a particular virtual warehouse or a particular execution node may be temporarily assigned to a specific data storage device, but the virtual warehouse or execution node may later access data from any other data storage device.

In the example of FIG. 3, virtual warehouse 302 includes three execution nodes 308, 310, and 312. Execution node 308 includes a cache 314 and a processor 316. Execution node 310 includes a cache 318 and a processor 320. Execution node 312 includes a cache 322 and a processor 324. Each execution node 308, 310, 312 is associated with processing one or more data storage and/or data retrieval tasks. For example, a particular virtual warehouse may handle data storage and data retrieval tasks associated with a particular user or customer. In other implementations, a particular virtual warehouse may handle data storage and data retrieval tasks associated with a particular data storage system or a particular category of data.

Similar to virtual warehouse 302 discussed above, virtual warehouse 304 includes three execution nodes 326, 328, and 330. Execution node 326 includes a cache 332 and a processor 334. Execution node 328 includes a cache 336 and a processor 338. Execution node 330 includes a cache 340 and a processor 342. Additionally, virtual warehouse 306 includes three execution nodes 344, 346, and 348. Execution node 344 includes a cache 350 and a processor 352. Execution node 346 includes a cache 354 and a processor 356. Execution node 348 includes a cache 358 and a processor 360.

Although the execution nodes shown in FIG. 3 each include one cache and one processor, alternative embodiments may include execution nodes containing any number of processors and any number of caches. Additionally, the caches may vary in size among the different execution nodes. The caches shown in FIG. 3 store, in the local execution node, data that was retrieved from one or more data storage devices in a storage platform 114 (see FIG. 1). Thus, the caches reduce or eliminate potential bottleneck problems occurring in platforms that consistently retrieve data from remote storage systems. Instead of repeatedly accessing data from the remote storage devices, the systems and methods described herein access data from the caches in the execution nodes which is significantly faster and avoids the bottleneck problem. In some embodiments, the caches are implemented using high-speed memory devices that provide fast access to the cached data. Each cache can store data from any of the storage devices in storage platform 114.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. In some embodiments, the cache resources and computing resources associated with a particular execution node are determined when the execution node is created, based on the expected tasks to be performed by the execution node.

Additionally, the cache resources and computing resources associated with a particular execution node may change over time based on changing tasks performed by the execution node. For example, a particular execution node may be assigned more processing resources if the tasks performed by the execution node become more processor intensive. Similarly, an execution node may be assigned more cache resources if the tasks performed by the execution node require a larger cache capacity.

Although virtual warehouses 302, 304, 306 are associated with the same execution platform 112 of FIG. 1, the virtual warehouses may be implemented using multiple computing systems at multiple geographic locations. For example, virtual warehouse 302 can be implemented by a computing system at a first geographic location, while virtual warehouses 304 and 306 are implemented by another computing system at a second geographic location. In some embodiments, these different computing systems are cloud-based computing systems maintained by one or more different entities.

Additionally, each virtual warehouse is shown in FIG. 3 as having multiple execution nodes. The multiple execution nodes associated with each virtual warehouse may be implemented using multiple computing systems at multiple geographic locations. For example, a particular instance of virtual warehouse 302 implements execution nodes 308 and 310 on one computing platform at a particular geographic location and implements execution node 312 at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse. Execution platform 112 is also fault tolerant. For example, if one virtual warehouse fails, that virtual warehouse is quickly replaced with a different virtual warehouse at a different geographic location.

A particular execution platform 112 may include any number of virtual warehouses 302, 304, 306. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

Figure 4:
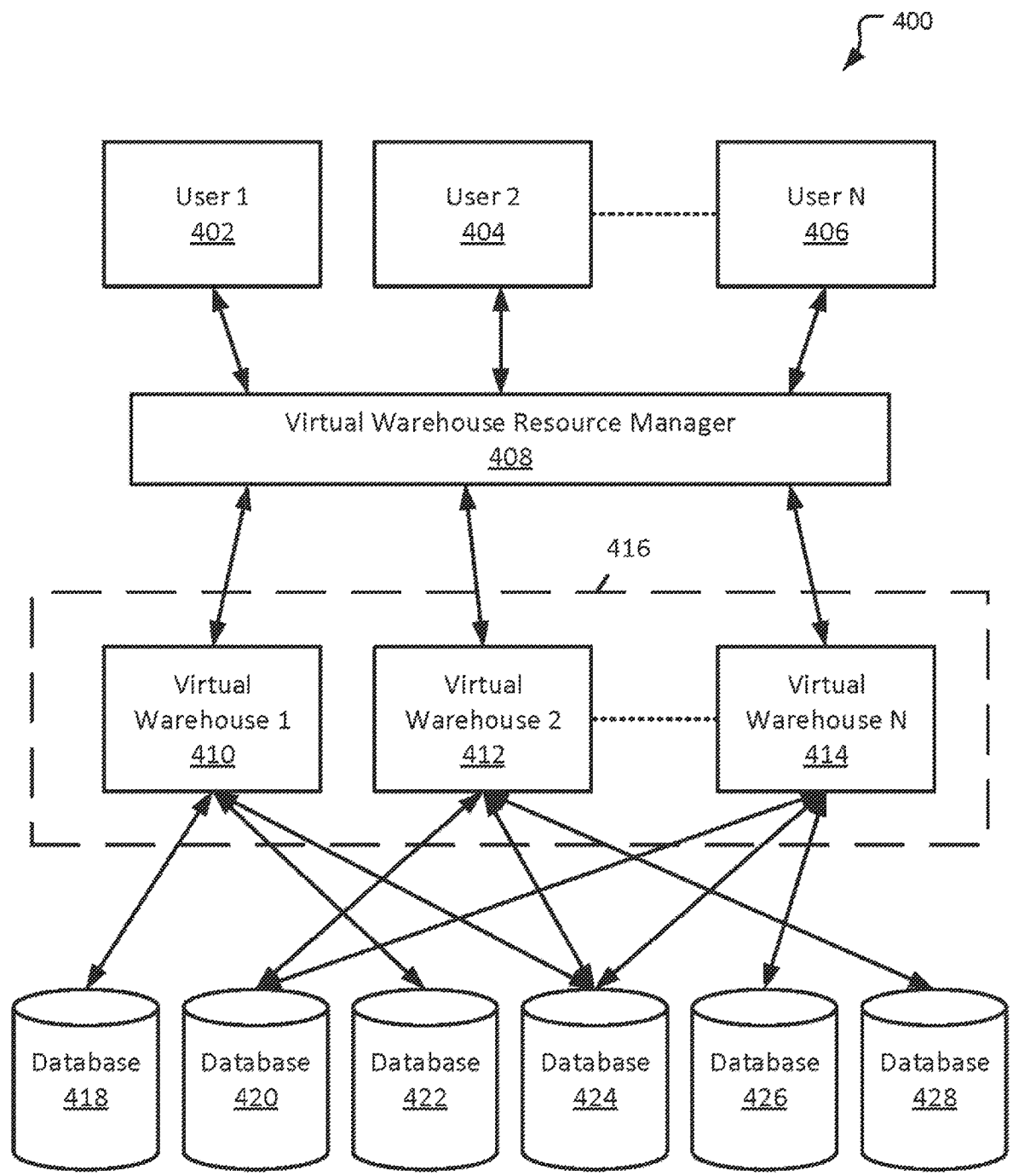
FIG. 4 illustrates a block diagram of components of an operating environment in accordance with the teachings and principles of the disclosure.

FIG. 4 is a block diagram depicting an embodiment of an operating environment 400 with multiple users accessing multiple databases through a load balancer and multiple virtual warehouses contained in a virtual warehouse group. Environment 400 includes a virtual warehouse resource manager 408 and multiple virtual warehouses 410, 412, and 414 arranged in a virtual warehouse group 416. Virtual warehouse resource manager 408 may be contained in resource manager 102. In particular, multiple users 402, 404, and 406 access multiple databases 418, 420, 422, 424, 426, and 428 through virtual warehouse resource manager 408 and virtual warehouse group 416. In some embodiments, users 402-406 access virtual warehouse resource manager 408 through resource manager 102 (FIG. 1). In some embodiments, virtual warehouse resource manager 408 is implemented within resource manager 102.

Users 402-406 may submit data retrieval and data storage requests to virtual warehouse resource manager 408, which routes the data retrieval and data storage requests to an appropriate virtual warehouse 410-414 in virtual warehouse group 416. In some implementations, virtual warehouse resource manager 408 provides a dynamic assignment of users 402-406 to virtual warehouses 410-414. When submitting a data retrieval or data storage request, users 402-406 may specify virtual warehouse group 416 to process the request without specifying the particular virtual warehouse 410-414 that will process the request. This arrangement allows virtual warehouse resource manager 408 to distribute multiple requests across the virtual warehouses 410-414 based on efficiency, available resources, and the availability of cached data within the virtual warehouses 401-414. When determining how to route data processing requests, virtual warehouse resource manager 408 considers available resources, current resource loads, number of current users, and the like.

In some embodiments, fault tolerance systems create new virtual warehouses in response to a failure of a virtual warehouse. The new virtual warehouse may be in the same virtual warehouse group or may be created in a different virtual warehouse group at a different geographic location.

Each virtual warehouse 410-414 is configured to communicate with a subset of all databases 418-428. For example, in environment 400, virtual warehouse 410 is configured to communicate with databases 418, 422, and 424. Similarly, virtual warehouse 412 is configured to communicate with databases 420, 424, and 428. And, virtual warehouse 414 is configured to communicate with databases 420, 424, and 426. In alternate embodiments, virtual warehouses 410-414 may communicate with any (or all) of the databases 418-428.

Although environment 400 shows one virtual warehouse group 416, alternate embodiments may include any number of virtual warehouse groups, each associated with any number of virtual warehouses. For example, different virtual warehouses may be created for each customer or group of users. Additionally, different virtual warehouses may be created for different entities, or any other group accessing different data sets. Multiple virtual warehouse groups may have different sizes and configurations. The number of virtual warehouse groups in a particular environment is dynamic and may change based on the changing needs of the users and other systems in the environment.

Figure 5:
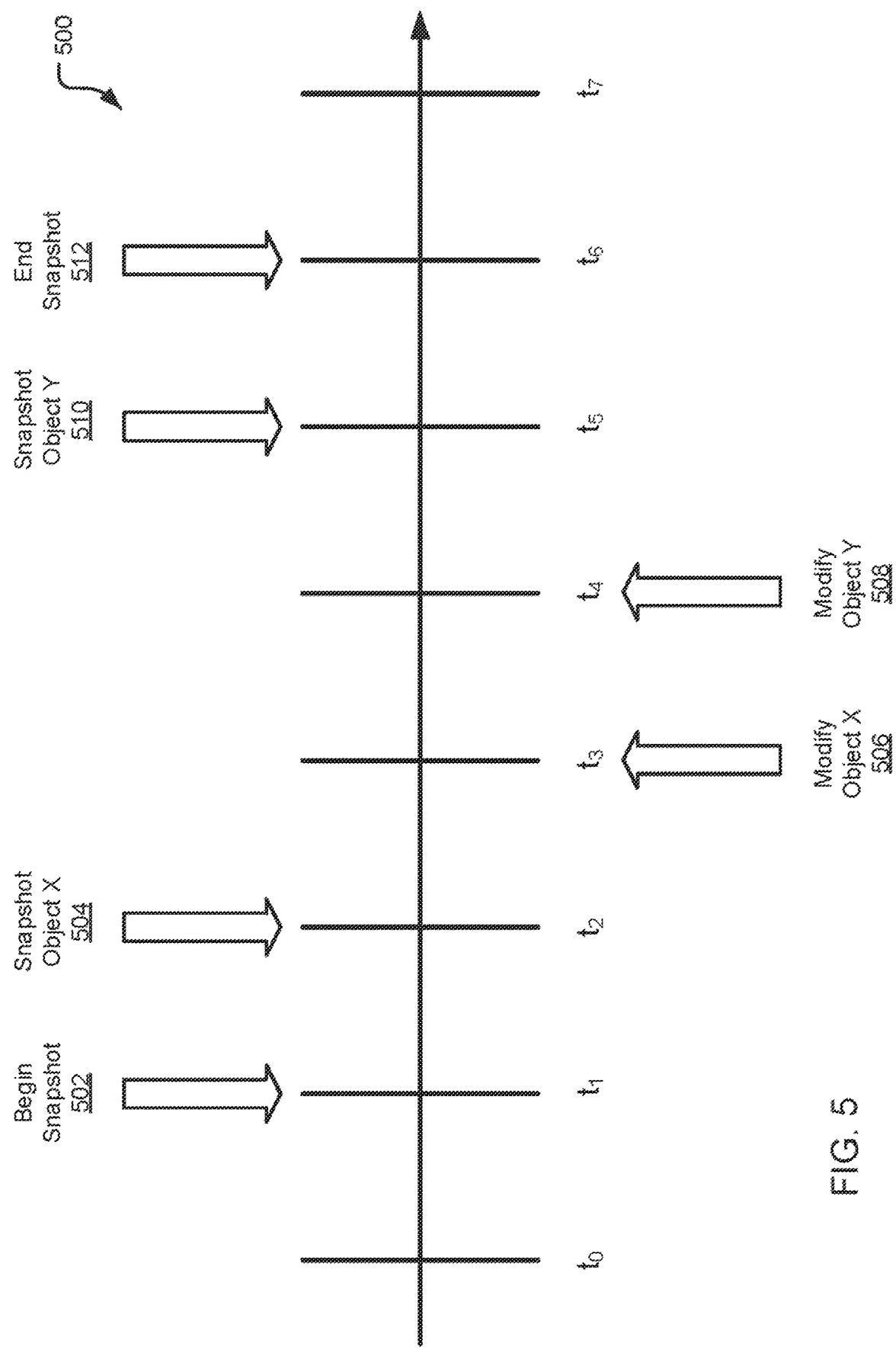
FIG. 5 illustrates a schematic diagram of a process flow for generating a database snapshot in accordance with the teachings and principles of the disclosure.

FIG. 5 is a schematic diagram illustrating a process flow 500 for generating a database snapshot. The database snapshot enables instantiating a copy of a source database in a different location, e.g., copying database data stored in a primary deployment into a secondary deployment. The snapshot captures one or more objects of the database, for example the structure of the database (e.g., schemas, tables, views, etc.) and/or the contents of the database (i.e. rows). In certain embodiments, the conceptually cleanest approach occurs where the snapshot reflects a transactionally consistent view of the database at a specific point in time. In an embodiment, a transactionally consistent point in time snapshot is not a strict requirement and it is sufficient to generate a snapshot that can be brought through the application of a set of transaction log records to a transactionally consistent state.

The process flow 500 illustrates a timeline depicting a snapshot that is initiated at time $t_1$ and completes at time $t_6$. The process flow 500 begins and a snapshot is initiated at 502. A snapshot of object X is generated at 504 at time $t_2$ and the snapshot of object Y is generated at 510 at time $t_5$. It should be appreciated that object X and object Y may represent any two objects in the database. As illustrated, object X is modified at 506 at time $t_3$ and object Y is modified at 508 at time $t_4$. Object X is modified at 506 after the snapshot of object X is generated at 504. Object Y is modified at 508 before the snapshot of object Y is generated at 510. The snapshot ends at 512.

Depending on semantics of how individual object snapshots are generated, the process flow 500 illustrated in FIG. 5 may or may not produce a transactionally consistent point in time representation of objects X and Y. If the snapshot representation of an object is generated based on the state of the object at the time the snapshot was initiated, the snapshot itself will be a transactionally consistent representation of the database at the point at which the snapshot began. For example, in the context of FIG. 5, the semantics would correspond to producing snapshot representations of both X and Y based on the state at time $t_1$ and would lead to a snapshot that provides a transactionally consistent view of both X and Y at point in time $t_1$. If, however, the snapshot representation of an object is generated based on the object at the time the snapshot representation of the object is generated, the snapshot will not necessarily be a transactionally consistent representation of the database at any point in time. For example, in the context of FIG. 5, the semantics would correspond to producing a snapshot representation of X based on its state at time $t_2$ and a snapshot representation of Y based on its state at time $t_5$. This combination would produce a snapshot that corresponds to a database state that never existed and is potentially invalid depending on the relationship, if any, between the two modifications at 506 and 508.

For example, a potentially anomalous state may occur where modification at time $t_3$ adds a column to table X and the modification at time $t_4$ creates table Y based on a CTAS involving the new column on table X. The CTAS essentially generates a new table object by performing a select-query against the database. This select-query could involve multiple tables in the database. In an example implementation, there may be a dependency between the data and structure of objects X and Y. In such an implementation, there may be a scenario where object X does not have a column even if object Y was created based on both the data and structure of object X. This scenario may create the possibility that structural changes and content changes may interact in subtle ways. Other scenarios may exist that lead to guaranteed inconsistencies. For example, if the modifications to X and Y are part of a single transaction, then producing a snapshot based on the current state would lead to a torn transaction where part of the transaction is reflected in the snapshot and another part of the transaction is not reflected in the snapshot.

In an embodiment, regardless of how the snapshot is generated, it is possible to bring the target to a transactionally consistent state at the end of the snapshot time by starting with the snapshot and then applying any log records generated during the snapshot timeframe in the serialized order of the log records. In such an embodiment, the previous statement assumes that applying a log record is an idempotent operation where the target database already reflects the update made by a particular log record and applying the log record is a no-op. In the context of such an example, applying the log records affiliated with the modifications at time $t_3$ and time $t_4$ to the generated snapshot will lead to an end state consistent as of time $t_6$ regardless of how the individual object snapshots were generated.

In an embodiment of database replication, the snapshot provides the initial state for the target database upon which all subsequent changes will be applied. In an embodiment, a snapshot is generated for database data stored in a primary deployment such that the database data may be copied in one or more secondary deployments. In a further embodiment, a snapshot is generated for a secondary deployment to capture any updates made to the database data stored in the secondary deployment while a primary deployment, or one or more other secondary deployments, were unavailable. If the snapshot is inconsistent with the source database, the target database will also be inconsistent with the source database. Applying further changes to the inconsistent starting point will, in general, not correct the inconsistency. For example, if a client account fails over from a source database (in an embodiment, the source database is the primary deployment) to a replica secondary deployment that has drifted from the source database (in this case, the primary deployment), the net effect is data corruption and/or data loss. Because a failover can take place at any time, ensuring transaction consistency between a source database (e.g., primary deployment) and a target database (e.g., secondary deployment) may be critical to the value proposition of database replication. In an embodiment, ensuring consistency of the database constructed from a snapshot is a building block for establishing and maintaining consistency between a source database and a target database at all times.

In an embodiment, the various pieces of information that comprise a database includes metadata files. An implementation of the metadata files may be referred to herein as Expression Property "EP" files. EP files may specifically include cumulative table metadata including information about all data that is stored throughout a table in the database. EP files may further include grouping expression properties that include information about the data stored in a grouping of micro-partitions within the table. EP files may further include micro-partition statistics that include information about data stored in a specific micro-partition of the table, such as minimum/maximum values, null count, number of entries, and so forth. EP files may further include column expression properties that include information about data stored in a particular column of a micro-partition of the table. The metadata files disclosed herein may specifically include EP files or may include any other file that includes information about database data.

Metadata files include information describing the structure of the database and may include the list and properties of any schemas in the database, the list and properties of tables and views in each schema, the list and properties of columns present in each table or view, and so forth. Individual table contents may be defined by a combination of EP files and any other form of metadata files. The individual tuple values of individual table contents may be stored in micro-partitions. In an embodiment, the precise set of micro-partitions that includes the contents of a particular table at a particular point in transactional time is included in the contents of a set of metadata files. In an embodiment, a metadata file can be considered to include a list of micro-partitions. Both micro-partitions and metadata files are immutable and may be stored and encrypted in storage. In an embodiment, the list of metadata files affiliated with a table at a particular point in transactional time is maintained in a metadata store that is separate from database data.

In an embodiment, the starting point for generating a snapshot of the database is the DatabaseDPO ("Database Data Persistence Object") stored in metadata. The DatabaseDPO is a data structure for interacting with persistent catalog information stored in metadata. The DatabaseDPO itself is effectively the root of a tree that includes all objects within the database, i.e., all objects needed for the snapshot. Each object in the tree rooted at the desired DatbaseDPO may be serialized into the snapshot. The serialized representation of an object may encapsulate everything necessary to recreate an exact copy of the object in the remote location (the target database).

For a table, there may be an additional question of how to serialize the table contents. In an embodiment, reading the entire table and serializing the contents may require extensive computing resources and may lead to very large snapshot sizes. In such an embodiment, it may be enough to serialize the list of metadata files for the table. As such, when the snapshot is consumed at the target database, the metadata files can be copied to the target, read at the target to derive the list of micro-partitions with all tuples, and those micro-partitions can be copied to the target as well. Both metadata files and micro-partitions may be encrypted in the snapshot and may include information that will allow the target to obtain the appropriate keys to decrypt the files. The files at the target may need to be re-encrypted with new keys that are managed by the target. In an embodiment, the snapshot image of a table includes a metadata file list as a representative of the table contents. Further in an embodiment, the snapshot includes some piece of information to enable the target to obtain one or more keys for making a copy of the metadata files and the micro-partitions.

In an embodiment, a transaction log record ensures the log records themselves include enough information to correctly and unambiguously reproduce the transaction change on the target. This may be satisfied because changes applied by the transaction log are known at commit time and the method may include capturing and serializing the metadata changes made by the transaction. In an embodiment, the transaction log record is accessible to all target databases regardless of deployment, region, or underlying cloud provider. The transaction log record may be written to remote storage.

In an embodiment, a primary deployment becomes unavailable and all database operations are shifted to a secondary deployment. During the time when the primary deployment is unavailable, all updates to the database data may be executed on the secondary deployment. A transaction log record may be generated for all updates executed on the secondary deployment, and the transaction log record may be used to propagate those updates to the primary deployment when the primary deployment is no longer unavailable. In such an embodiment, the use of the transaction log record may ensure that only those new updates (made to the secondary deployment) are executed on the primary deployment, and that no stale data or previously ingested data is propagated to the primary deployment.

In an embodiment, in terms of when the transaction log record is generated, the systems, methods, and devices as disclosed herein are configured to ensure the write of the transaction log record is effectively part of the transaction itself. The transaction log record may only be written to remote storage if the transaction commits, and further the transaction only commits if the transaction log record is written to remote storage. A deviation from such a procedure may lead to a transactional inconsistency between the source database and the target database.

In the primary database, clustered tables may be monitored using automatic clustering and reclusters as needed. As part of a refresh operation, clustered tables are replicated to a secondary database with the current sorting of the table micro-partitions. As such, reclustering is not performed again on the clustered tables in the secondary database, which would be redundant. If a secondary database contains clustered tables and the database is promoted to become the primary database, automatic clustering of the tables begins in this database while simultaneously suspending the monitoring of clustered tables in the previous primary database.

In the primary database, automatic background maintenance of materialized views is performed. When a base table changes, all materialized views defined on the table are updated by a background service that uses compute resources. In addition, if automatic clustering is enabled for a materialized view, then the view is monitored and reclustered as necessary in the primary database.

In some cases, a refresh operation may replicate the materialized view definitions to a secondary database; the materialized view data is not replicated. Automatic background maintenance of materialized views in a secondary database is enabled by default. If automatic clustering is enabled for a materialized view in the primary database, automatic monitoring and reclustering of the materialized view in the secondary database may also be enabled.

The operations described above do not directly address data replication with cross reference group references. For example, when an entity in the primary database is associated with another entity outside the primary database, the default response to a command for replicating the data from the primary database to the secondary database is to fail the command. The user may be informed with a report or notification. As discussed below, the present disclosure provides methods and techniques to complete the data replication process without fail, such as when the cross RG references do not pose security issues.

Figure 6:
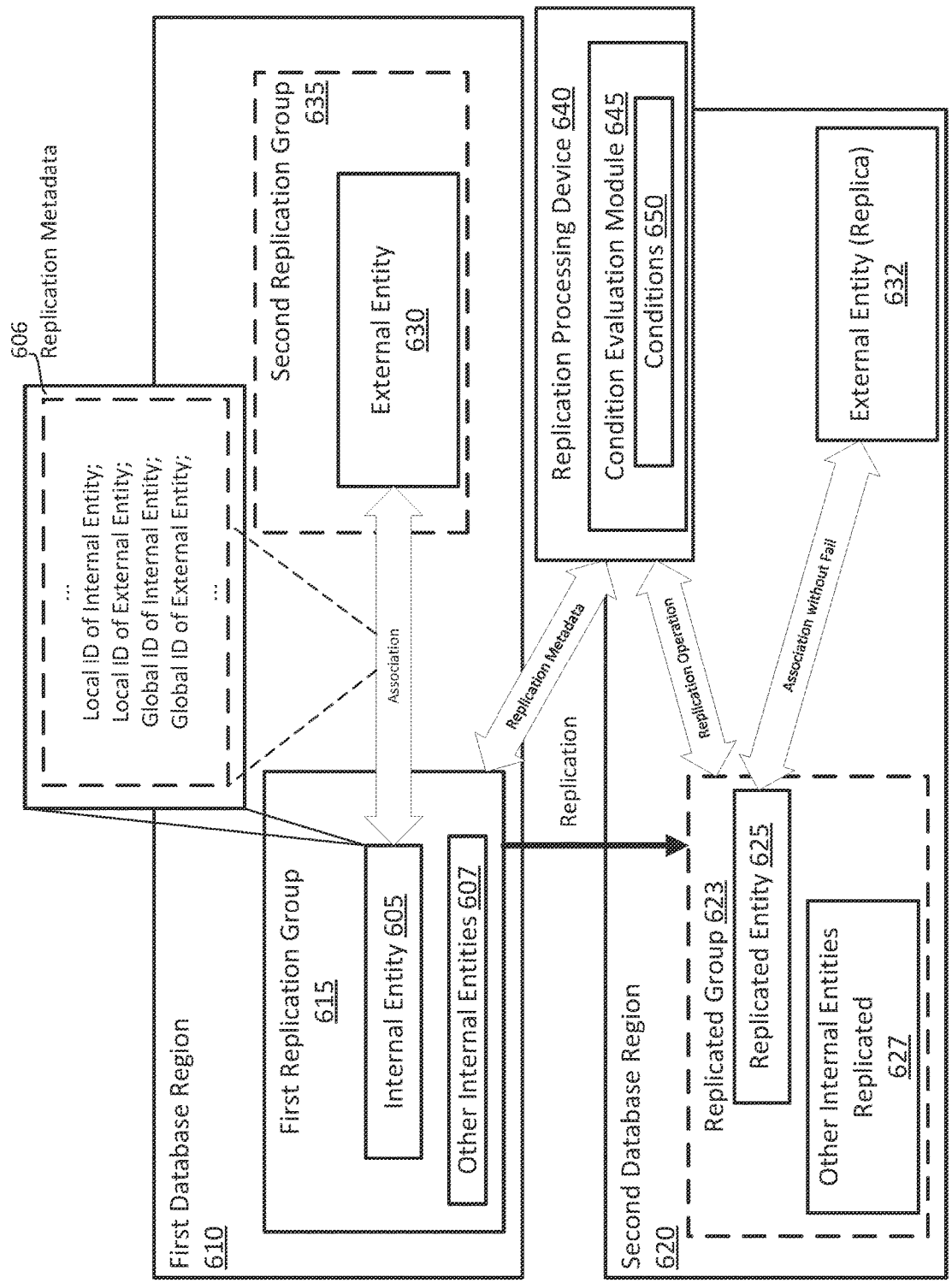
FIG. 6 illustrates a block diagram of data replication with cross replication group (RG) references, in accordance with the teachings and principles of the disclosure.

FIG. 6 illustrates a block diagram of data replication with cross replication group (RG) references, in accordance with the teachings and principles of the disclosure. As shown, a first replication group 615 is to be replicated from the first database region 610 (e.g., a primary database) to the second database region 620 (e.g., a secondary database). Such data replication may enable customers to implement centralized governance. The customers may define tags and policies for masking, row access, and potentially others in a single database (e.g., the first database region 610) and apply them to objects or entities across databases (e.g., the second database region 620).

In conventional practices, however, such database replication is configured to fail if a cross-database (ID-based) reference (e.g., a dangling reference) is present (e.g., in the snapshot of the first replication group 615). Such cross-database references have caused replication issues in the past with sequences and MVs. The present disclosure overcomes these replication issues and provides data replication with centralized governance features desired by customers. Example desired central governance has the following object references: (1) masking and row access policy references can span databases; and (2) tag references that can span databases and account objects.

Previously, to work around replication issues, customers may be required to define policies and tags in each replicated database which makes auditability harder and reduces the value of policy-based governance or customers may be required to give up on replication (and the replication is automatically failed or aborted when dangling references are identified in the snapshot). To address these issues, group-based replication and support for cross-group references are implemented according to aspects of the present disclosure.

In group-based replication, customers may define a list of account object types as well as databases that should be replicated as a unit. Snapshots of the primary objects in that list are created consistently. ID-based cross-database references as well as account object references can thus be achieved when these objects are part of the same group. This approach may, however, suffer in replication performance, as the more objects are replicated, the longer the replication may take. Consistency is used for trading off performance. This approach also lacks features to minimize data loss and may create multiple groups with a small number of databases each. Therefore, cross RG references need be supported to realize the flexibility of creating multiple groups and overcome issues of dangling references in a centralized governance implementation, as disclosed herein.

At present, data replication commands involving cross RG references will fail for any dangling (cross RG) references. During the snapshot visit on the primary database, the references where one object (referring object) refers to another object (referred object) are collected. A list of all objects that are present in the snapshot is also collected/generated based on the collected information. Every referred object is then checked or verified to be part of the snapshot. These verifications are performed using the entity IDs. If any such referred entity is missing in the snapshot, an error may be prompted back to the secondary database to fail the refresh. In an example, references may be collected by inspecting different properties of the entity and inferring these relationships through code. Object relationships may be tracked and provided to the users.

Aspects of the present disclosure support cross RG references, so that not all data replication commands involving cross RG references are failed. As shown in FIG. 6, a replication processing device 640 may perform a data replication operation to replicate the internal entity 605 of the first replication group 615 of the first database region 610 to the second database region 620 as the replicated entity 625.

The replication processing device 640 may receive a request to replicate the first replication group 615 in the first database region 610. The first replication group 615 includes the internal entity 605. The replication processing device 640 may capture a snapshot of the first replication group 615 in the first database region 610. The snapshot includes the replication metadata and data required to synchronize the replicated entity 625 in the second database region 620 to the internal entity 605 in the first database region 610.

The replication processing device 640 identifies an association between the internal entity 605 and an external entity 630 outside of the first replication group 615. The external entity 630 may be referred to as a cross RG reference or a dangling reference, as replicating the first replication group 615 would not include replicating the external entity 630. The association includes a first global identifier (ID) for the internal entity 605 and a second global identifier for the external entity 630. In some cases, the respective global IDs are also captured in the snapshot.

The replication processing device 640 records the identified association in a replication metadata 606 of the internal entity 605. The replication metadata 606 includes relationship information between the internal entity 605 and other internal entities 607 that enable the internal entity to function normally. A number of the other entities 607 are also located in the first database region 610 (some may be located outside of the first replication group 615, such as another external entity not shown). The replication processing device 640 may, based on the replication metadata 606 and when one or more conditions are satisfied, replicate the internal entity 605 in the second database region 620 as the replicated entity 625, along with replicating the number of the other entities 607 in the first database region 610 to the second database region 620 as the other internal entities 627. The replicated entity 625 is associated with the replica (external entity) 632 of the external entity 630. The replica 632 is outside of the replicated group 623.

In some cases, the replication processing device 640 replicates the first replication group 615 from the first database region 610 into the replicated group 623 in the second database region 620. The replicated group 623 may be referred to another replication group. The replicated group 623 may correspondingly include the replicated entity 625 and the other entities 627 associated. In some cases, the external entity 630 may belong to a second replication group 635 that may be previously replicated in another replication session (and becomes the external entity replica 632). The local and global IDs for the internal entity 605 and the external entity 630 (and replica 632) may be updated accordingly.

The replication processing device 640 may include a condition evaluation module 645 for evaluating whether the association between the internal entity 605 and the external entity 630 may trigger or result in exfiltration or security breach. The condition evaluation module 645 may include specific conditions 650 set or identified for specific entity types, as described below. In general, the internal entity 605 or the external entity 630 may include at least one of: an account, a database, a file, or an object. The association between the internal entity 605 and the external entity 630 may be identified based on at least but not limited to one of: a table, a masking policy, a row access policy, a materialized view, a sequence, or a tag; and wherein the external entity is a dangling reference to the internal entity such that the external entity and the internal entity belong to different reference groups.

The following Table 1 provides some example situations when entities A and B are different failover/replication groups. The entity A may be the internal entity 605, while the entity B may be the external entity 630.

TABLE 1

| Cross Group Reference | Old Behaviors | Currently Disclosed Behaviors |
|---|---|---|
| Table (A) → Masking Policy (B) | [A] replication fails | [A] replication may continue if conditions are satisfactory |
| Table (A) → Row Access Policy (B) | [A] replication fails | [A] replication may continue if conditions are satisfactory |
| Materialized View (A) → Table (B) | [A] replication fails | [A] replication may continue if conditions are satisfactory |
| Table (A) → Sequence (B) | [A] replication fails | [A] replication may continue if conditions are satisfactory |

Depending on the nature of entities A and B, different replication procedures may be implemented. For example, the replication procedures may include the following: (1) A is replicated before B; (2) A is replicated after B; (3) Object in A is dropped on source, Object in B is dropped on source, secondary B is refreshed before secondary A; (4) B is dropped on target; (5) A is not replicated while B is replicated; or (6) B is not replicated while A is replicated.

In some cases, customer specifies a knob in the replication group to allow replication without references (e.g., without references), except the knob is honored if the missing reference breaks the workload (e.g., invalid MV) but does not lead to security issues the knob is not honored if the missing reference can lead to data exfiltration (e.g., a lack of masking or row access).

In some cases, the replication may implicitly mirror primary database's behavior on the secondary database. Data replication may succeed even when some MVs are invalid or cause inserts to fail on a table when the sequence has been dropped, same as primary refreshes fail if they may lead to data exfiltration (e.g., imposing any risk to security) due to a lack of masking or row access policy on secondary, same as primary. Customers may, as a result, replicate all of the objects as a single group or ensure that the centralized governance database is replicated first.

Figure 7:
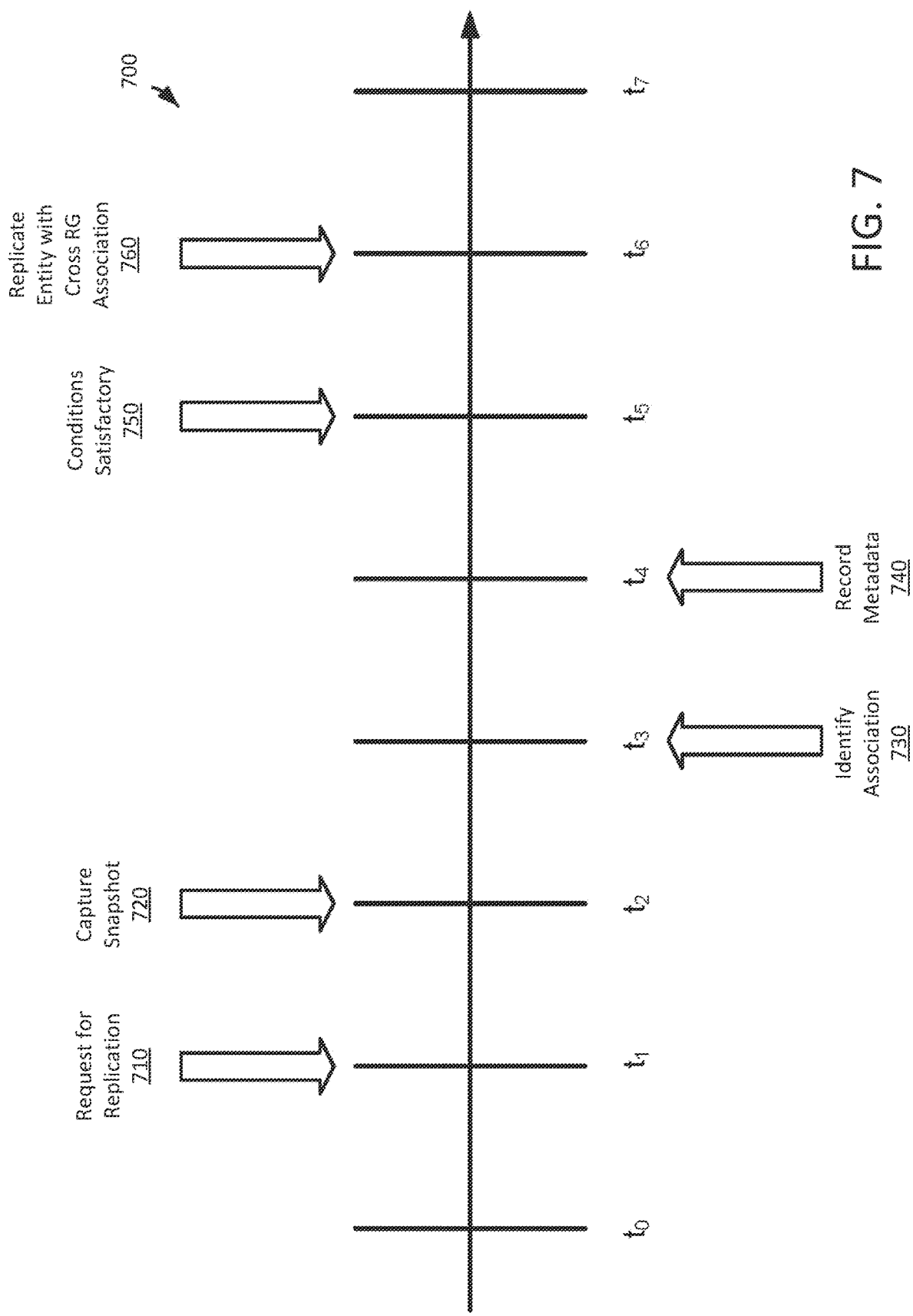
FIG. 7 illustrates a schematic diagram of a process flow for completing a replication command with cross RG references, in accordance with the teachings and principles of the disclosure.

FIG. 7 illustrates a schematic diagram of a process flow 700 for completing a replication command with cross RG references, in accordance with the teachings and principles of the disclosure. As shown, at 710 ($t_1$), a request for replication is received. The request may be a user command or a scheduled event. At 720, a snapshot of the entities to be replicated in the primary database is captured. At 730, the associations or relationships of the entities to be replicated are analyzed based on the captured snapshot. At 740, the identified associations are recorded in the metadata for the secondary database. The metadata may include a specific field for dangling references or cross RG references. When such dangling references are identified, at 750, conditions of the dangling references (along with other aspects of the data replication) are evaluated. For example, whether the dangling references have been replicated, available, mapped, or known, and whether the association to the dangling references imposes security risks. Upon determining that the conditions are satisfactory at 750, at 760, the entities are replicated with cross RG association.

Figure 8:
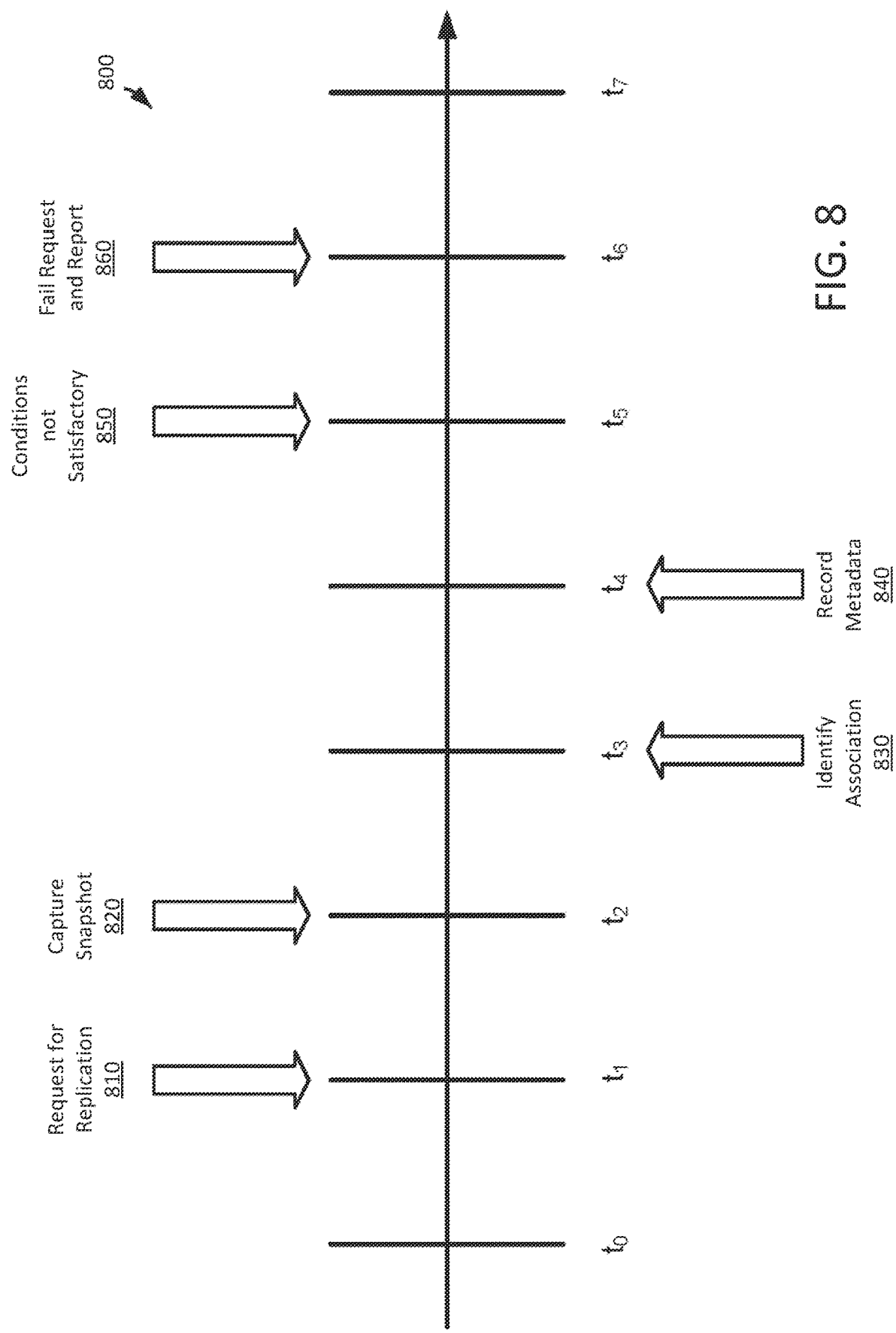
FIG. 8 illustrates a schematic diagram of a process flow for failing a replication command with cross RG references, in accordance with the teachings and principles of the disclosure.

FIG. 8 illustrates a schematic diagram of a process flow 800 for failing a replication command with cross RG references, in accordance with the teachings and principles of the disclosure. Similar to the process flow 700, at 810, a request for replication is received. At 820, a snapshot of the entities to be replicated in the primary database is captured. At 830, the associations or relationships of the entities to be replicated are analyzed based on the captured snapshot. At 840, the identified associations are recorded in the metadata for the secondary database. The metadata may include a specific field for dangling references or cross RG references. When such dangling references are identified, at 850, conditions of the dangling references (along with other aspects of the data replication) are evaluated. Unlike the process flow 700, the conditions are not satisfactory at 850. For example, the cross RG references may not be available for mapping, not found (e.g., cannot retrieve a global ID), or may trigger exfiltration or security concerns. Upon determining that the conditions are not satisfactory at 850, the replication request is failed and a report may be generated for user review at 860.

Figure 9:
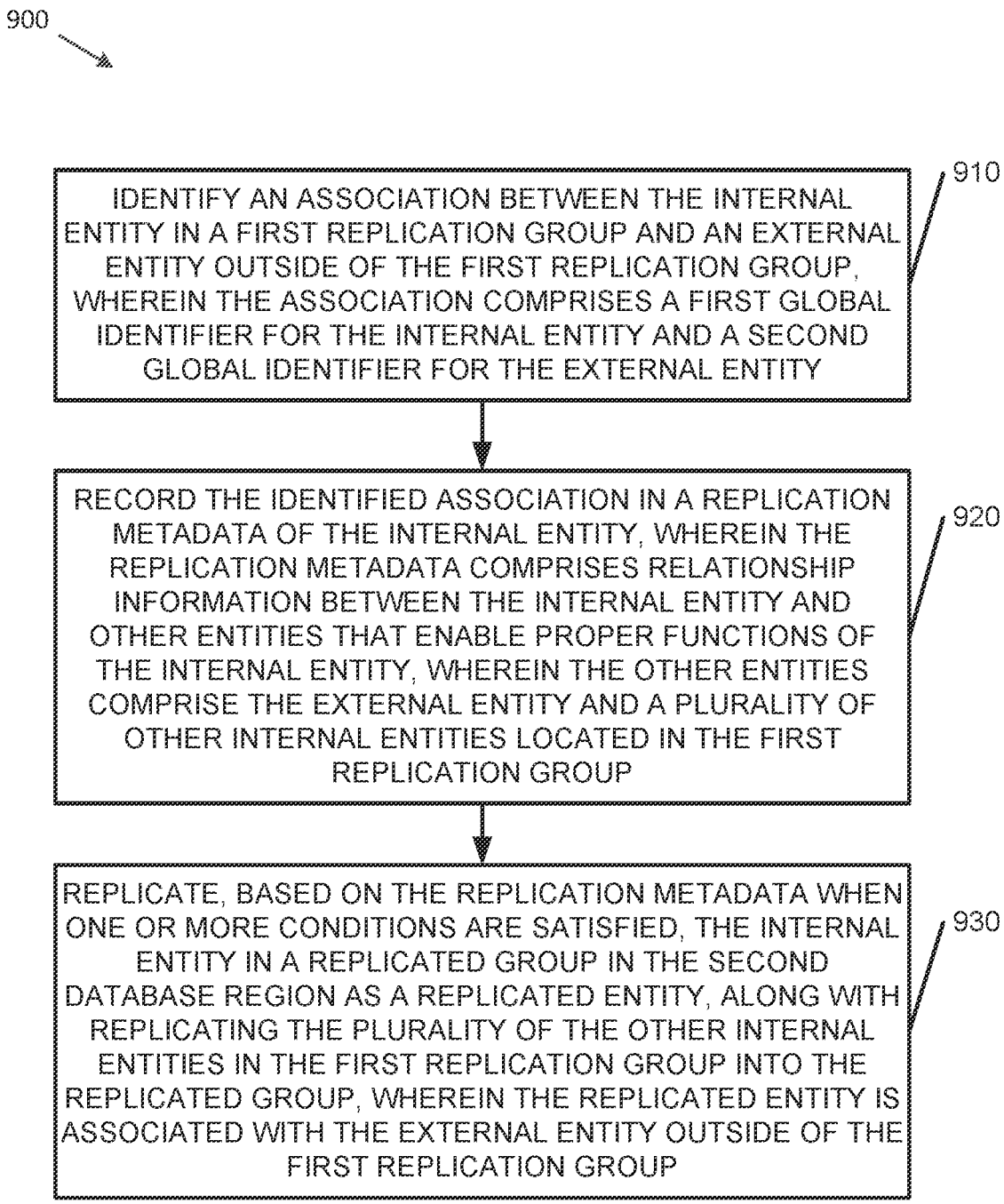
FIG. 9 illustrates a schematic flow chart diagram of a method for database failover in accordance with the teachings and principles of the disclosure.

FIG. 9 is a schematic flow chart diagram of a method 900 for replicating an internal entity in a first database region to a second database region. The method 900 may be executed by one or more computing resources such as a resource manager 102, execution platform 112, and/or replication and failover manager 228 as disclosed herein.

The method 900 begins at 910 by identifying an association between the internal entity in a first replication group and an external entity outside of the first replication group. The external entity may also be in the first database region (e.g., as the external entity 630 shown in FIG. 6). The association may include a first global identifier for the internal entity and a second global identifier for the external entity. For example, a global identifier may uniquely identify an entity in a database, a region of the database, or two or more networked databases.

At 920, the identified association is recorded in a replication metadata of the internal entity. The replication metadata may include relationship information between the internal entity and other entities that enable proper functions of the internal entity. The other entities may include the external entity and multiple other internal entities located in the first replication group.

At 930, a processing device replicates, based on the replication metadata when one or more conditions are satisfied, the internal entity in a replicated group in the second database region as a replicated entity, along with replicating the plurality of the other internal entities in the first replication group into the replicated group. The replicated entity is associated with the external entity outside of the first replication group.

In aspects, the method 900 may further include receiving a request to replicate a replication group in the first database region. The processing device captures a snapshot of the replication group in the first database region. The snapshot includes the replication metadata and data required to match or synchronize the replicated entity in the second database region to the internal entity in the first database region.

In aspects, the internal entity or the external entity includes at least but not limited to one of: an account, a database, a file, or an object. In some cases, the association between the internal entity and the external entity is identified based on at least but not limited to one of: a table, a masking policy, a row access policy, a materialized view, a sequence, or a tag. The external entity is a dangling reference (e.g., a cross RG reference, such as the external entity 630 of FIG. 6) to the internal entity such that the external entity and the internal entity belong to different reference groups. In some cases, the replicated entity is associated with the external entity outside of the first replication group via a replica of the external entity (e.g., such as the replica 632 of FIG. 6). The replica of the external entity may reside in the second database region and outside of the replicated group, while the external entity may reside in a second replication group in the first database region.

In aspects, the one or more conditions may include a determination by the processing device that the association between the internal entity and the external entity is free from security threats or breach as indicated by missing masking or row access in the replication metadata. In some cases, replicating the internal entity in the second database region as the replicated entity further includes: retrieving the second global identifier for the external entity from a snapshot captured for replicating a replication group in the first database region. The snapshot includes the replication metadata and data required to synchronize the replicated entity in the second database region to the internal entity in the first database region.

In some cases, the method 900 may further include, upon determining that the one or more conditions are not satisfied, terminating replication of the internal entity in the second database region; and providing a notice to a user regarding the termination. In some cases, upon determining that the one or more conditions are not satisfied, the method 900 may further include reporting, to a user, a notification of a disruption of the replication of the internal entity. The notification may include one or more operation options, which include at least one of: (1) removal of the association between the internal entity in the first replication group and the external entity outside of the first replication group; or (2) proceeding with replication of the internal entity in the second database region. For example, the notification may provide, in a user-interface, options to the user to respond with an input. The processing device may then receive a selection of the operation options from the user and execute the selection of the operation options.

Figure 10:
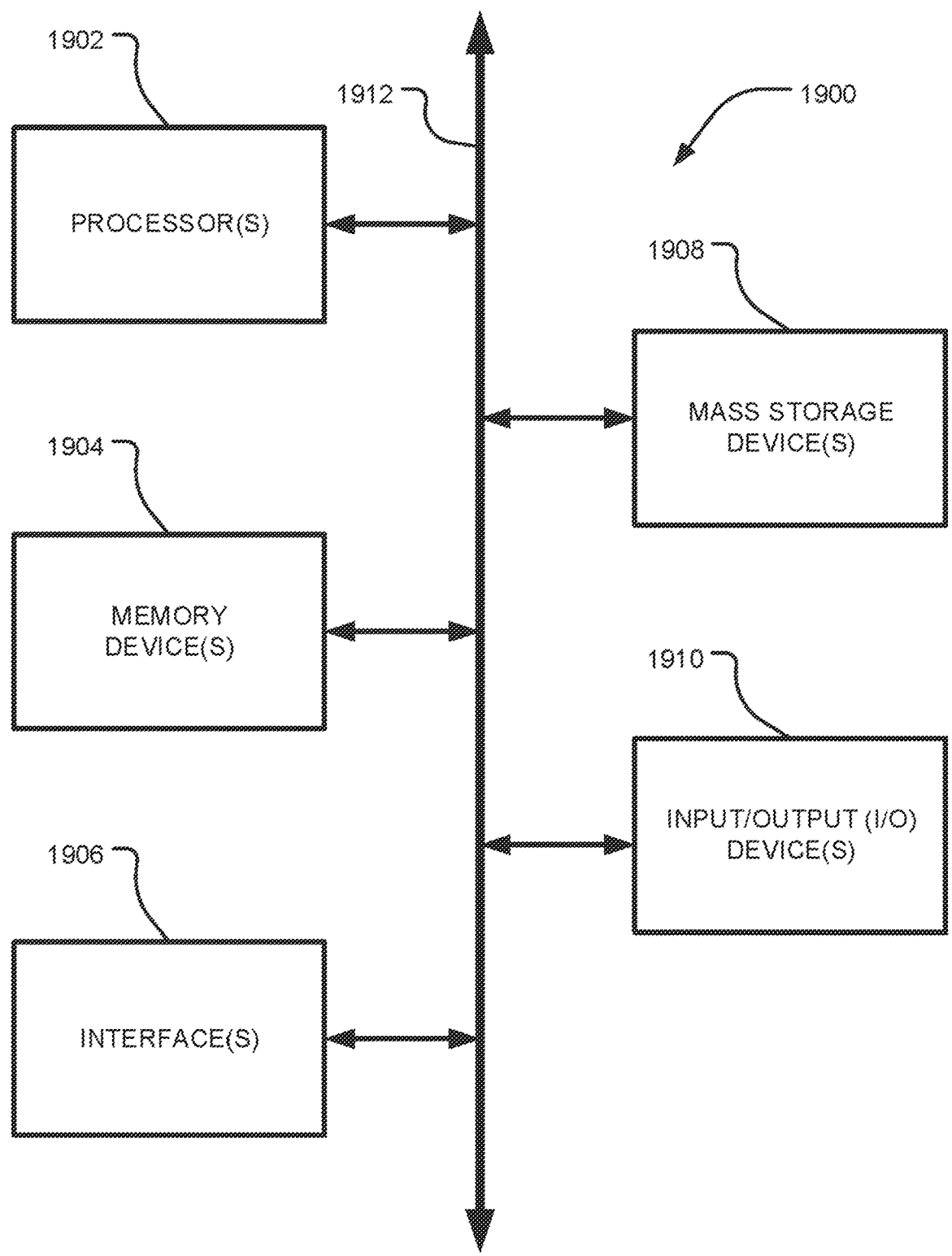
FIG. 10 illustrates an example computing device in accordance with the teachings and principles of the disclosure.

FIG. 10 is a block diagram depicting an example computing device 1900. In some embodiments, computing device 1900 is used to implement one or more of the systems and components discussed herein. For example, computing device 1900 may allow a user or administrator to access the resource manager 102. Further, computing device 1900 may interact with any of the systems and components described herein. Accordingly, computing device 1900 may be used to perform various procedures and tasks, such as those discussed herein. Computing device 1900 can function as a server, a client or any other computing entity. Computing device 1900 can be any of a wide variety of computing devices, such as a desktop computer, a notebook computer, a server computer, a handheld computer, a tablet, and the like.

Computing device 1900 includes one or more processor(s) 1902, one or more memory device(s) 1904, one or more interface(s) 1906, one or more mass storage device(s) 1908, and one or more Input/Output (I/O) device(s) 1910, all of which are coupled to a bus 1912. Processor(s) 1902 include one or more processors or controllers that execute instructions stored in memory device(s) 1904 and/or mass storage device(s) 1908. Processor(s) 1902 may also include various types of computer-readable media, such as cache memory.

Memory device(s) 1904 include various computer-readable media or non-transitory memories, such as volatile memory (e.g., random access memory (RAM)) and/or non-volatile memory (e.g., read-only memory (ROM)). Memory device(s) 1904 may also include rewritable ROM, such as Flash memory.

Mass storage device(s) 1908 include various computer readable media, such as magnetic tapes, magnetic disks, optical disks, solid state memory (e.g., Flash memory), and so forth. Various drives may also be included in mass storage device(s) 1908 to enable reading from and/or writing to the various computer readable media. Mass storage device(s) 1908 include removable media and/or non-removable media.

I/O device(s) 1910 include various devices that allow data and/or other information to be input to or retrieved from computing device 1900. Example I/O device(s) 1910 include cursor control devices, keyboards, keypads, microphones, monitors or other display devices, speakers, printers, network interface cards, modems, lenses, CCDs or other image capture devices, and the like.

Interface(s) 1906 include various interfaces that allow computing device 1900 to interact with other systems, devices, or computing environments. Example interface(s) 1906 include any number of different network interfaces, such as interfaces to local area networks (LANs), wide area networks (WANs), wireless networks, and the Internet.

Bus 1912 allows processor(s) 1902, memory device(s) 1904, interface(s) 1906, mass storage device(s) 1908, and I/O device(s) 1910 to communicate with one another, as well as other devices or components coupled to bus 1912. Bus 1912 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 1900 and are executed by processor(s) 1902. Alternatively, the systems and procedures described herein can be implemented in hardware, or a combination of hardware, software, and/or firmware. For example, one or more application specific integrated circuits (ASICs) can be programmed to carry out one or more of the systems and procedures described herein. As used herein, the term "module" is intended to convey the implementation apparatus for accomplishing a process, such as by hardware, or a combination of hardware, software, and/or firmware, for the purposes of performing all or parts of query operations.

The systems and methods described herein allow data to be stored and accessed as a service that is separate from computing (or processing) resources. Even if no computing resources have been allocated from the execution platform, data is available to a virtual warehouse without requiring reloading of the data from a remote data source. Thus, data is available independently of the allocation of computing resources associated with the data. The described systems and methods are useful with any type of data. In particular embodiments, data is stored in a structured, optimized format. The decoupling of the data storage/access service from the computing services also simplifies the sharing of data among different users and groups. As discussed herein, each virtual warehouse can access any data to which it has access permissions, even at the same time as other virtual warehouses are accessing the same data. This architecture supports running queries without any actual data stored in the local cache. The systems and methods described herein are capable of transparent dynamic data movement, which moves data from a remote storage device to a local cache, as needed, in a manner that is transparent to the user of the system. Further, this architecture supports data sharing without prior data movement since any virtual warehouse can access any data due to the decoupling of the data storage service from the computing service.

Although the present disclosure is described in terms of certain preferred embodiments, other embodiments will be apparent to those of ordinary skill in the art, given the benefit of this disclosure, including embodiments that do not provide all of the benefits and features set forth herein, which are also within the scope of this disclosure. It is to be understood that other embodiments may be utilized, without departing from the scope of the present disclosure.

What is claimed is:

1. A method of replicating an internal entity in a first database region to a second database region, the method comprising:
    identifying an association between the internal entity in a first replication group and an external entity outside of the first replication group, wherein the association comprises a first global identifier for the internal entity and a second global identifier for the external entity;
    recording the identified association in a replication metadata of the internal entity, wherein the replication metadata comprises relationship information between the internal entity and other entities that enable proper functions of the internal entity, wherein the other entities comprise the external entity and a plurality of other internal entities located in the first replication group; and
    replicating, by a processing device based on the replication metadata when one or more conditions are satisfied, the internal entity in a replicated group in the second database region as a replicated entity, along with replicating the plurality of the other internal entities in the first replication group into the replicated group, wherein the replicated entity is associated with the external entity outside of the first replication group.

2. The method of claim 1, further comprising:
    receiving a request to replicate the first replication group in the first database region; and
    capturing, in response to the request received, a snapshot of the first replication group in the first database region, wherein the snapshot comprises the replication metadata and data to match the replicated entity in the replicated group to the internal entity in the first replication group.

3. The method of claim 1, wherein the internal entity or the external entity comprises at least one of: an account, a database, a file, or an object.

4. The method of claim 3, wherein the association between the internal entity and the external entity is identified based on at least one of: a table, a masking policy, a row access policy, a materialized view, a sequence, or a tag; and wherein the external entity is a dangling reference to the internal entity such that the external entity and the internal entity belong to different reference groups.

5. The method of claim 3, wherein the replicated entity is associated with the external entity outside of the first replication group via a replica of the external entity, wherein the replica of the external entity resides in the second database region and outside of the replicated group and wherein the external entity resides in a second replication group in the first database region.

6. The method of claim 1, wherein the one or more conditions comprise at least:
    a determination by the processing device that the association between the internal entity and the external entity is free from security threats or breach as indicated by a lack of masking or row access in the replication metadata.

7. The method of claim 6, wherein replicating the internal entity in the second database region as the replicated entity further comprises:
    retrieving the second global identifier for the external entity from a snapshot captured for replicating the first replication group in the first database region, the snapshot comprising the replication metadata and data required to synchronize the replicated entity in the replicated group to the internal entity in the first replication group.

8. The method of claim 6, further comprising:
    upon determining that the one or more conditions are not satisfied, terminating replication of the internal entity in the second database region; and
    providing a notice to a user regarding the termination.

9. The method of claim 6, further comprising:
    upon determining that the one or more conditions are not satisfied, reporting, to a user, a notification of a disruption of the replication of the internal entity, wherein the notification comprises operation options, wherein the operation options comprise at least one of:
        (1) removal of the association between the internal entity in the first replication group and the external entity outside of the first replication group; or
        (2) proceeding with replication of the internal entity in the second database region;
    receiving, from the user, a selection of the operation options; and
    executing the selection of the operation options.

10. The method of claim 9, further comprising:
    upon executing the selection of operation options comprising proceeding with replication of the internal entity in the second database region, replicating a replica of the external entity; and associating the replica of the external entity and the internal entity in the second database region based on respective global identifiers.

11. A system comprising:

a memory; and one or more processors operatively coupled to the memory, the one or more processors to:

identify an association between an internal entity in a first replication group of a first database region and an external entity outside of the first replication group, wherein the internal entity is to be replicated to a second database region, and wherein the association comprises a first global identifier for the internal entity and a second global identifier for the external entity;

record the identified association in a replication metadata of the internal entity, wherein the replication metadata comprises relationship information between the internal entity and other entities that enable proper functions of the internal entity, wherein the other entities comprise the external entity and a plurality of other internal entities located in the first replication group; and replicate, based on the replication metadata when one or more conditions are satisfied, the internal entity in a replicated group in the second database region as a replicated entity, along with replicating the plurality of the other internal entities in the first replication group into the replicated group, wherein the replicated entity is associated with the external entity outside of the first replication group.

12. The system of claim 11, wherein the one or more processors are further to:

receive a request to replicate the first replication group in the first database region; and capture, in response to the request received, a snapshot of the first replication group in the first database region, wherein the snapshot comprises the replication metadata and data to match the replicated entity in the replicated group to the internal entity in the first replication group.

13. The system of claim 11, wherein the internal entity or the external entity comprises at least one of: an account, a database, a file, or an object.

14. The system of claim 13, wherein the association between the internal entity and the external entity is identified based on at least one of: a table, a masking policy, a row access policy, a materialized view, a sequence, or a tag; and wherein the external entity is a dangling reference to the internal entity such that the external entity and the internal entity belong to different reference groups.

15. The system of claim 13, wherein the replicated entity is associated with the external entity outside of the first replication group via a replica of the external entity, wherein the replica of the external entity resides in the second database region and outside of the replicated group and wherein the external entity resides in a second replication group in the first database region.

16. The system of claim 11, wherein the one or more conditions comprise at least:

a determination that the association between the internal entity and the external entity is free from security threats or breach as indicated by a lack of masking or row access in the replication metadata.

17. The system of claim 16, wherein the one or more processors are to replicate the internal entity in the second database region as the replicated entity by:

retrieving the second global identifier for the external entity from a snapshot captured for replicating the first replication group in the first database region, the snapshot comprising the replication metadata and data required to synchronize the replicated entity in the replicated group to the internal entity in the first replication group.

18. The system of claim 16, wherein the one or more processors are further to:

upon determining that the one or more conditions are not satisfied, terminate replication of the internal entity in the second database region; and provide a notice to a user regarding the termination.

19. The system of claim 16, wherein the one or more processors are further to:

upon determining that the one or more conditions are not satisfied, report, to a user, a notification of a disruption of the replication of the internal entity, wherein the notification comprises operation options, wherein the operation options comprise at least one of:

(1) removal of the association between the internal entity in the first replication group and the external entity outside of the first replication group; or (2) proceeding with replication of the internal entity in the second database region;

receive, from the user, a selection of the operation options; and execute the selection of the operation options.

20. The system of claim 19, wherein the one or more processors are further to:

upon executing the selection of operation options comprising proceeding with replication of the internal entity in the second database region, replicate a replica of the external entity; and associate the replica of the external entity and the internal entity in the second database region based on respective global identifiers.

21. A non-transitory computer-readable medium having instructions stored thereon which, when executed by one or more processors, causes the one or more processors to replicate an internal entity in a first database region to a second database region by:

identifying an association between the internal entity in a first replication group and an external entity outside of the first replication group, wherein the association comprises a first global identifier for the internal entity and a second global identifier for the external entity;

recording the identified association in a replication metadata of the internal entity, wherein the replication metadata comprises relationship information between the internal entity and other entities that enable proper functions of the internal entity, wherein the other entities comprise the external entity and a plurality of other internal entities located in the first replication group; and replicating, based on the replication metadata when one or more conditions are satisfied, the internal entity in a replicated group in the second database region as a replicated entity, along with replicating the plurality of the other internal entities in the first replication group into the replicated group, wherein the replicated entity is associated with the external entity outside of the first replication group.

22. The non-transitory computer-readable medium of claim 21, wherein the one or more processors are further to:
- receive a request to replicate the first replication group in the first database region; and
- capture, in response to the request received, a snapshot of the first replication group in the first database region, wherein the snapshot comprises the replication metadata and data to match the replicated entity in the replicated group to the internal entity in the first replication group.

23. The non-transitory computer-readable medium of claim 21, wherein the internal entity or the external entity comprises at least one of: an account, a database, a file, or an object.

24. The non-transitory computer-readable medium of claim 23, wherein the association between the internal entity and the external entity is identified based on at least one of: a table, a masking policy, a row access policy, a materialized view, a sequence, or a tag; and wherein the external entity is a dangling reference to the internal entity such that the external entity and the internal entity belong to different reference groups.

25. The non-transitory computer-readable medium of claim 23, wherein the replicated entity is associated with the external entity outside of the first replication group via a replica of the external entity, wherein the replica of the external entity resides in the second database region and outside of the replicated group and wherein the external entity resides in a second replication group in the first database region.

26. The non-transitory computer-readable medium of claim 21, wherein the one or more conditions comprise at least:
- a determination that the association between the internal entity and the external entity is free from security threats or breach as indicated by a lack of masking or row access in the replication metadata.

27. The non-transitory computer-readable medium of claim 26, wherein the one or more processors are to replicate the internal entity in the second database region as the replicated entity by:
- retrieving the second global identifier for the external entity from a snapshot captured for replicating the first replication group in the first database region, the snapshot comprising the replication metadata and data required to synchronize the replicated entity in the replicated group to the internal entity in the first replication group.

28. The non-transitory computer-readable medium of claim 26, wherein the one or more processors are further to:
- upon determining that the one or more conditions are not satisfied, terminate replication of the internal entity in the second database region; and
- provide a notice to a user regarding the termination.

29. The non-transitory computer-readable medium of claim 26, wherein the one or more processors are further to:
- upon determining that the one or more conditions are not satisfied, report, to a user, a notification of a disruption of the replication of the internal entity, wherein the notification comprises operation options, wherein the operation options comprise at least one of:
  (1) removal of the association between the internal entity in the first replication group and the external entity outside of the first replication group; or
  (2) proceeding with replication of the internal entity in the second database region;
- receive, from the user, a selection of the operation options; and
- execute the selection of the operation options.

30. The non-transitory computer-readable medium of claim 29, wherein the one or more processors are further to:
- upon executing the selection of operation options comprising proceeding with replication of the internal entity in the second database region, replicate a replica of the external entity; and
- associate the replica of the external entity and the internal entity in the second database region based on respective global identifiers.

* * * * *